US010922872B2

(12) United States Patent
Mitchell et al.

(10) Patent No.: US 10,922,872 B2
(45) Date of Patent: *Feb. 16, 2021

(54) NOISE REDUCTION ON G-BUFFERS FOR MONTE CARLO FILTERING

(71) Applicant: Disney Enterprises, Inc., Burbank, CA (US)

(72) Inventors: Kenneth Mitchell, Glendale, CA (US); Jose A. Iglesias-Guitian, Edinburgh (GB); Bochang Moon, Edinburgh (GB); Steven G. McDonagh, Edinburgh (GB)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/510,677

(22) Filed: Jul. 12, 2019

(65) Prior Publication Data

US 2019/0340806 A1 Nov. 7, 2019

Related U.S. Application Data

(63) Continuation of application No. 15/621,245, filed on Jun. 13, 2017, now Pat. No. 10,403,026.

(60) Provisional application No. 62/417,915, filed on Nov. 4, 2016.

(51) Int. Cl.
*G06T 15/06* (2011.01)
*G06T 13/20* (2011.01)
*G06T 3/00* (2006.01)

(52) U.S. Cl.
CPC .............. *G06T 15/06* (2013.01); *G06T 13/20* (2013.01); *G06T 3/0093* (2013.01)

(58) Field of Classification Search
CPC ... B29C 51/002; B29C 70/68; B29K 2101/12; B29L 2031/30; D06M 15/227; D06M 15/507; D06M 15/59; E05D 15/165; E05F 15/689; E05Y 2900/55
See application file for complete search history.

(56) References Cited

U.S. PATENT DOCUMENTS

| | | | |
|---|---|---|---|
| 2003/0048849 A1* | 3/2003 | Tomita, Jr. ........... | H04N 19/503 375/240.25 |
| 2006/0005029 A1* | 1/2006 | Petrovic ................ | H04N 5/913 713/176 |
| 2016/0098820 A1* | 4/2016 | Rousselle ............. | G06T 5/002 345/426 |
| 2016/0321523 A1* | 11/2016 | Sen ....................... | G06T 5/002 |

OTHER PUBLICATIONS

NPL: Comprehensible Rendering of 3-D Shapes, Aug. 1990, Saito (Year: 1990).*

* cited by examiner

*Primary Examiner* — Ming Wu
(74) *Attorney, Agent, or Firm* — Patterson + Sheridan, LLP

(57) ABSTRACT

Techniques for selectively removing Monte Carlo (MC) noise from a geometric buffer (G-buffer). Embodiments identify the G-buffer for rendering an image of a three-dimensional scene from a viewpoint. Embodiments determine, for each of a plurality of pixels in the image being rendered, respective world position information based on the three-dimensional scene and a position and orientation of the viewpoint. A pre-filtering operation is then performed to selectively remove the MC noise from the G-buffer, based on the determined world position information for the plurality of pixels.

20 Claims, 5 Drawing Sheets

NOISE REDUCTION ON G-BUFFERS FOR MONTE CARLO FILTERING

CROSS-REFERENCE TO RELATED APPLICATIONS

This application is a continuation of co-pending U.S. patent application Ser. No. 15/621,245, filed on Jun. 13, 2017, which claims benefit of U.S. provisional patent application 62/417,915, filed on Nov. 4, 2016. Each of the aforementioned patent applications is herein incorporated by reference in its entirety.

BACKGROUND

Field of the Invention

The present disclosure relates to the field of computer animation and, in particular, to selectively reducing noise within a geometric buffer.

Description of the Related Art

This application relates to the field of computer graphics and animation and to the interfaces for defining the same. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

SUMMARY

Embodiments provides a method, system and non-transitory computer-readable medium for selectively removing noise from a geometric buffer (G-buffer). The method, system and non-transitory computer-readable medium include identifying the G-buffer for rendering an image of a three-dimensional scene from a viewpoint. The G-buffer contains a plurality of values, and at least one of (i) a depth-of-field effect and (ii) a motion effect has been applied to the G-buffer. The method, system and non-transitory computer-readable medium include determining, for each of a plurality of pixels in the image being rendered, respective world position information based on the three-dimensional scene and a position and orientation of the viewpoint. Additionally, the method, system and non-transitory computer-readable medium include performing a pre-filtering operation to selectively remove noise from the G-buffer, based on the determined world position information for the plurality of pixels.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
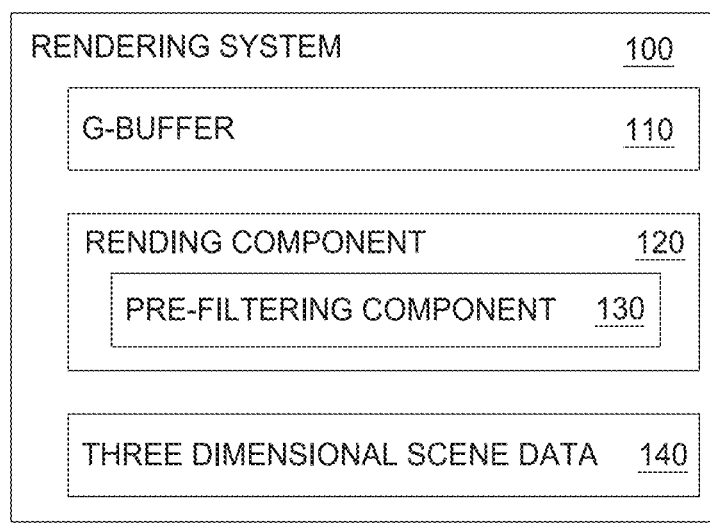
FIG. 1 depicts a rendering system configured with a pre-filtering component, according to one embodiment described herein.

In computer-generated animation, a character's appearance is defined by a three-dimensional computer model. To appear realistic, the computer model of a character is often extremely complex, having millions of surfaces and tens of thousands of attributes. Due to the complexity involved with animating such complex models, animation tools often rely on animation variables to define the character's animation. Animation variables, which are sometimes referred to as avars, are parameters used by complicated functions, often referred to as deformers, to modify the pose or bodily position of a character model.

Generally, the values of animation variables can vary over time, and the changes this produces are responsible for the animation effect observed by the viewer. The pairing of an animation variable value and the moment in time that value is in effect is often referred to in the industry as a keyframe. Keyframes may or may not be present for all time values. There are several public and also proprietary methods for interpolating the value of an animation variable at the times in between keyframes, thus controlling the appearance and motion of the character between specified keyframes.

The association between animation variables and deformer functions (and the configuration of the same) is categorically known as the character's rigging. There are several public and proprietary methods and techniques used in computer animation rigging. The type of rigging used and how it is controlled by animation variables defines how an animated character can be made to move. For instance, a rig could be generated (e.g., for an organic character) that effectively describes the skeleton of the character. As an example, such a rig could specify a number of joints of the character, their locations, how the joints are permitted to move, rotate, and so on. The eventual effect of the rigging, through deformer functions, is to distort the original three-dimensional character model into the desired shape and position, where the character model can then be rendered and viewed.

Animation variables can be relatively simple, such as those used to specify the position and orientation of a model or a portion thereof. For example, simple animation variables can specify the rotation angles of the joints of a character model, thereby positioning the character model's limbs and appendages. More complicated animation variables can be used to abstract complicated modifications of a character model to a relatively simple control. For example, complicated animation variables can define the degree of opening of a character's mouth. In this example, the value of the animation variable is processed and transformed internal to the rigging, with the results provided to one or more complicated deformer functions to control the position, orientation, and deformation of the many different parts of the character model needed to open the characters mouth to the desired degree.

For some animation variables, animation programs allow for direct, in-camera manipulation of animation variable values. This capability is typically limited to a small subset of the animation variables in a character, usually those controlling the primary translation, rotation or scale of a body part or feature. For example, a user can click and drag a model in a rendered view to a new position to set the value of the model's position animation variables. This direct manipulation interface allows the user to visually (and often interactively) manipulate the model to specify the values of animation variables. Animation variables without direct manipulators are usually edited with other less-representative user interface elements such as text boxes or sliders placed adjacent to the rendered view.

Generally, in computer animation, a three dimensional (3D) object, such as an animatable character, is first modeled, via a static 3D mesh to represent the 3D object. The modeled 3D object is then bound, or attached, to a system of joints, bones, and control handles to prepare the object for animation. This process is generally known as rigging. Once the object is rigged, one or more animators define motions of the various joints, bones, and control handles to cause the rigged object to perform a variety of motions as appropriate for the character, such as walking, running, crawling, and motions of the mouth, as when smiling, laughing, or speaking.

To animate a 3D object, an animator typically performs many thousands of manipulations to cause the object to perform the various functions in various scenes in a smooth and believable manner. These manipulations are performed by selecting and moving various "manipulators," where each manipulator causes a portion of the 3D object to change position, rotation, scale up or down, and so on. Typically, manipulators appear as 3D user interface elements with handles that may be moved or dragged. These actions can be mapped to one or more animation variables as part of the rigging. Using a manipulator can alter the values of the animation variables, which in turn alters the behavior of the deformers resulting in the desired motion of the 3D object. In general, the animator selects a portion of geometry of the 3D object (e.g., via a graphical user interface associated with an animation application program), where the selection causes one or more manipulators associated with the geometry to appear. The animator then selects one of the manipulators and performs a function on the manipulator, such as dragging, in order to move, rotate, or scale the associated portion of geometry. The animator continues this process for each keyframe in the animation to cause the 3D object to move in the desired manner.

Numerous computing platforms and tools have been specially designed for computer-aided animation and CGI. One such example is now known as PhotoRealistic RenderMan, or PRMan for short. PRMan is a photorealistic RenderMan-compliant rendering software system based on the RenderMan Interface Specification (RISpec). One core functional aspect of PRMan can include the use of a "rendering engine" to convert geometric and mathematical descriptions of objects into images. This process is known in the industry as "rendering." For movies, other animated features, shorts, and special effects, a user (e.g., a skilled computer graphics artist) can specify the geometric or mathematical description of objects to be used in the rendered image or animation sequence, such as characters, props, background, or the like. The geometric description of the objects may include a number of animation control variables (avars) and values for the avars. In some instances, an animator may also pose the objects within the image or sequence and specify motions and positions of the objects over time to create an animation. In other instances, motions and positions of some objects, such as hair, clothing, and plants are usually too complex for a human animator to directly control at every stage of a computer animation. Instead, the human animator specifies the physics and/or physical properties of one or more dynamic or simulated objects. A computer program then employs physically-based numerical methods and techniques to simulate the motions and positions of these objects over time based on the physics or physical properties of the individual objects.

Monte Carlo (MC) ray tracing has received extensive attention for synthesizing realistic rendering results. However, MC ray tracing generally requires a huge amount of ray samples (e.g., more than ten thousand samples per pixel) until a converged or even visually pleasing image is generated. Moreover, the slow convergence of MC ray tracing directly leads to exhaustive rendering time (e.g., hours), which is often proportional to the number of ray samples generated. Thus, when a relatively small number of ray samples (e.g., less than one hundred) per pixel are allocated, images are typically corrupted by MC noise, i.e., variances.

Generally, adaptive rendering techniques can adjust sampling density non-uniformly and apply smoothing locally, in order to significant boosts MC ray tracing by drastically reducing the required number of ray samples. These methods can generally be classified into two categories in terms of the dimensionality of MC samples: multi-dimensional rendering and image space adaptive rendering. For instance, multi-dimensional rendering methods can generally allocate samples and reconstruct them in a high dimensional space, where each coordinate corresponds to a random parameter in the MC integration. These methods can produce a high quality image even with a small number of samples (e.g., 8), but managing individual samples may require high computational and memory overhead. On the other hand, image space methods utilize per-pixel information (e.g., 56 colors, variances, and G-buffer) that can be easily obtained in rendering, and thus these techniques can be easily applied into existing rendering frameworks.

Such techniques have been shown to improve the performance of MC ray tracing by an order of magnitude. Their main target applications, however, are often limited to off-line rendering frameworks, since the computational overhead is relatively large due to their expensive reconstruction (e.g., non-local means and local regression). Especially, local linear approximation techniques can show a superior reconstruction performance compared to other rendering techniques when a reference image has a strong linear correlation with given features (e.g., textures), but with such performance comes a very expensive reconstruction time, since such techniques it utilize a complex optimization process (e.g., least-squares fitting).

Monte Carlo ray tracing methods, including distributed ray tracing and path tracing, are widely accepted to numerically solve the rendering equation, since they allow the efficient rendering of complex optical phenomena (e.g., depth-of-field or motion blur) by distributing rays according to the underlying analytic function that is being sampled. However, tracing hundreds or thousands of ray samples per pixel is still needed to achieve converged rendering results, leading to large rendering times (e.g., hours) which are often not acceptable for practical purposes. When a relatively small number of samples per pixel (spp) is used, e.g., 8-32 spp, the rendered images generally suffer from MC error (i.e., variance), which has been considered as one of the main problems of MC ray tracing techniques.

Image filtering methods can be applied for improving the performance of MC ray tracing, due to their main benefits such as inherent simplicity and generality. Generally, such techniques take the rendered image generated with a small number of samples as a noisy input, and producing a filtered image instead of allocating additional samples. The required number of samples needed to achieve a high-quality rendered images can drastically reduced by applying sophisticated image filters, such as cross-bilateral filter, non-local means, and weighted local regression.

One challenge of image filtering for MC ray tracing is in the fundamental difficulty to discern high frequency noise from MC features (e.g., noisy textures). For instance, a filtering method could utilize additional rendering-specific features in order to produce a high-quality filtering result. Such features could include geometric features such as normal, texture, and depth, which can be obtained easily during the rendering process. Generally, the use of such features improves the filtering quality by identifying the high-frequency edges introduced by discontinuities in G-buffers, but robustly utilizing the features in filtering frameworks can be challenging since these features may themselves contain noise due to distributed effects.

To account for noisy features, filtering techniques can utilize the variances of the geometric features during the filtering process or use an additional pre-filtering process, since the noisy features caused by depth-of-field or motion blur often have high variances. One drawback to such an approach, however, is that the feature variances can also be high where high-frequency edges exist in focused areas (e.g., noisy textures due to a bump mapping). Generally, these edges should be preserved, as removing them often results in under-blurred or over-blurred results.

As such, embodiments described herein provide techniques for selectively removing MC noise from a G-buffer. One embodiment provides a pre-filtering technique that uses world positions and their variances to effectively reduce MC noise in G-buffers. Such an embodiment may employ a per-pixel covariance matrix of world position samples, so that detailed features introduced by motion blurring are properly preserved by performing an anisotropic filtering along the major direction of motions per pixel. One embodiment employs Stein's unbiased risk estimator to locally estimate the optimal bandwidth for the pre-filtering operation, in order to minimize the pre-filtering error. By removing the MC noise contained in the G-buffer, embodiments can boost the performance of existing filtering methods for MC ray tracing.

FIG. 1 depicts a rendering system configured with a pre-filtering component, according to one embodiment described herein. As shown, the rendering system 100 includes a G-buffer 110, a rendering component 120 and three dimensional scene data 140. The rendering component 120 includes a pre-filtering component 130. Generally, the pre-filtering component 130 is configured to selectively removing Monte Carlo (MC) noise from the G-buffer 110. Such noise may have been introduced, for example, by a depth-of-field effect and/or a motion effect that has been applied to the G-buffer 110. The pre-filtering component 130 could identify the G-buffer for rendering an image of a three-dimensional scene from a viewpoint, and the pre-filtering component 130 could determine, for each of a plurality of pixels in the image being rendered, respective world position information based on the three-dimensional scene data 140 and a position and orientation of the viewpoint. The pre-filtering component 130 could then perform a pre-filtering operation to selectively remove the MC noise from the G-buffer, based on the determined world position information for the plurality of pixels.

Figure 2:
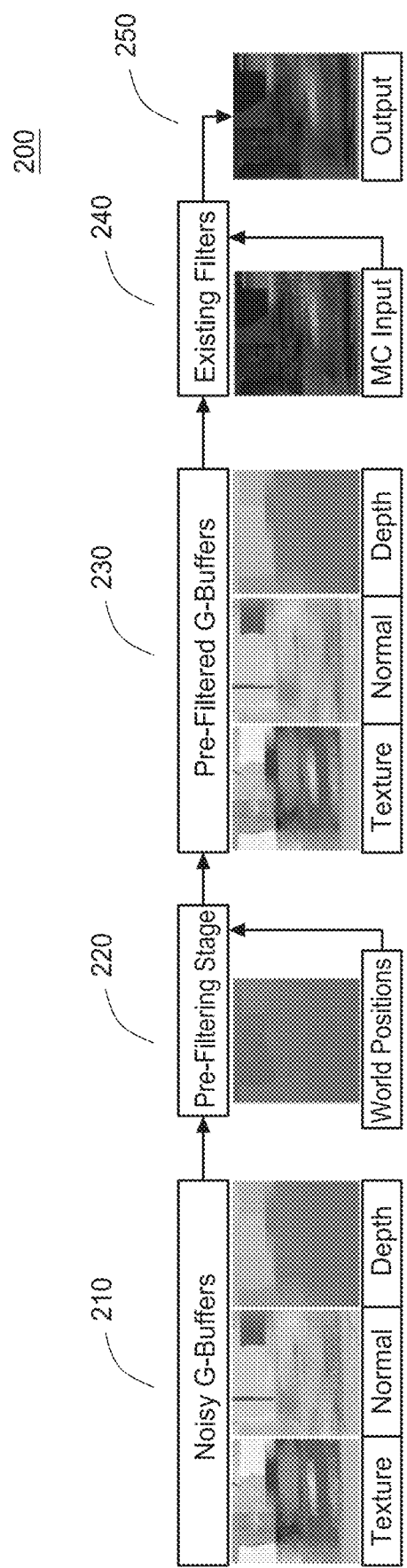
FIG. 2 is a block diagram illustrating a workflow for denoising a G-buffer, according to one embodiment described herein.

FIG. 2 is a block diagram illustrating a workflow for denoising a G-buffer, according to one embodiment described herein. As shown, the workflow 200 includes a first stage 210, a second stage 220, a third stage 230, a fourth stage 240 and a fifth stage 250. In the first stage 210, a noisy G-buffer is created. Examples of such G-buffers include normal buffers, texture buffers and depth buffers. Generally, undesirable noise can be introduced into such buffers in a variety of ways. For example, a distributed effect such as a depth-of-field effect and/or a motion effect could be applied to the G-buffer and, in the process, could introduce undesirable noise into the G-buffer. This undesirable noise, if left within the G-buffer, can result in a noisy output image (e.g., in the fifth stage 250), as, for example, subsequent filtering techniques applied to the G-buffer can construe the noise as a high-frequency edge.

As such, in the second stage 220, the pre-filtering component 130 performs a pre-filtering operation on the noisy G-buffer to selectively remove MC noise within the buffer. In doing so, the pre-filtering component 130 considers the world positions of various objects within the three-dimensional scene. For purposes of the following discussion, the problem of reducing the noise present within the G-buffer can be formulated as a pre-filtering process as shown in Equation 1.

Pre-filtering process $$\hat{g}_c(k) = \frac{1}{W} \sum_{i \in \Omega_c} w_i(k) \tilde{g}_i(k) \qquad \text{Equation 1}$$

In Equation 1, $\hat{g}_c(k)$ represents the filtered feature at center pixel c in the k-th feature buffer, and $w_i(k)$ represents the filtering weight allocated to a noisy feature $\tilde{g}_i(k)$ stored at the i-th neighboring pixel. In one embodiment, the neighboring pixels i are selected as the pixels within a regular filtering window $\Omega_c$ (e.g., a 7×7 window) centered at center pixel c and the normalization term W is set as shown in Equation 2, below.

$$W = \Sigma_{i \in \Omega_c} w_i(k) \qquad \text{Equation 2—Normalization Term}$$

In rendering, feature images $\tilde{g}_i(k)$ are commonly computed by averaging geometries such as normal, texture and depth samples at each pixels. However, such normal, texture and depth G-buffers can contain a significant amount of noise (e.g., due to a variety of distributed effects), which can lead to a sub-optimal result since many filtering techniques rely on the values within these G-buffers as edge-stopping functions. As such, the pre-filtering component 130 can pre-filter the input features $\tilde{g}_i(k)$, to provide an estimation of the unknown features $g(k)$ that can only be computed exactly with an infinite number of samples. In one embodiment, the pre-filtering component 130 can minimize a filtering error $|\hat{g}_c(k) - g_c(k)|^2$ by locally controlling the filtering weight, $w_i(k)$.

In selectively filtering noise from the G-buffers, the pre-filtering component 130 can utilize world positions, i.e., the intersection points between the three-dimensional scene and primary rays. For purposes of the present discussion, the j-th intersection point between scenes and the j-th ray at a pixel i is defined as $s_{i,j}'$, and the world position samples $s_{i,j}$ are computed using the intersection point defined in Equation 3.

Intersection Point $$\begin{pmatrix} s_{i,j} \\ 1 \end{pmatrix} = M^{-1} \begin{pmatrix} s_{i,j}' \\ 1 \end{pmatrix}$$  Equation 3

In Equation 3, M represents a 4×4 transformation matrix, which can include per-sample motion such as rotation and translation. When a sample does not include a motion value, this matrix becomes the identity matrix. In this case, our world position sample $s_{i,j}$ is equivalent to the intersection point $s_{i,j}'$.

One advantage for using the modified intersection point sample $s_{i,j}$ is that it allows the computation of a per-pixel covariance matrix that estimates a per-pixel motion introduced by motion blurring. For example, for a rotating sphere without translations, the pre-filtering component 130 could compute the intersection points between the sphere and the rays within a pixel, and could determine that the points are very similar without regards to the rotation speed. On the other hand, such modified world position samples can have a different distribution with regard to a motion. As such, the pre-filtering component 130 can utilize modified world position samples to provide a high quality filtering result for motion blurring effects, since such position samples can provide insights on the anisotropic weighting that considers the distribution caused by a local motion.

After computing each world position sample, the pre-filtering component 130 can average the samples within a pixel to perform pixel-based pre-filtering. This is illustrated in Equation 4, below:

$\tilde{p}_i = 1/n_i \sum_{j=1}^{n_i} s_{i,j}$  Equation 4—Pixel-based Pre-filtering In Equation 4, $n_i$ represents the number of world position samples at pixel i. Given the world positions $\tilde{p}_i$, the pre-filtering component 130 can define the filtering weight $w_i(k)$ at a neighboring pixel i for the k-th feature as a function that takes the world positions, as shown in Equation 5.

Filtering Weight $$w_i(k) \equiv w(\tilde{p}_i, \tilde{p}_c) = \exp\left(-\frac{d(\tilde{p}_i, \tilde{p}_c)}{2h^2}\right)$$  Equation 5

As shown in Equation 5, $d(\tilde{p}_i, \tilde{p}_c)$ represents a distance function that computes a similarity between two world positions stored in pixel i and center c. In one embodiment, the filtering weight function $w_i(k)$ is independent of the type of feature, k, instead of adjusting the weight for each feature type.

Through the use of the world positions-based weighting, the pre-filtering component 130 can robustly identify the problematic regions within a G-buffer, i.e., the noisy geometries in defocused areas of the image, by estimating the variances of the world positions. For example, the variances may typically be low in the focused areas of the image, since the detailed edges (e.g., noisy normal) are introduced by a shading process. As an alternative, the pre-filtering component 130 can estimate noise in the G-buffers by utilizing the variances of the buffers, and then apply a pre-filtering operation on each buffer based on the estimated variances of the buffers, since the variances tend to be high for problematic regions such as defocused areas.

Such approaches, however, can fail to preserve very detailed edges in focused areas, as such areas tend to have high measures of variance. For example, normals in focused areas have detailed edges and corresponding high variances due to the bump mapping, but such edges should be preserved since they are not MC noise, despite exhibiting high variances. As a result, it can be fundamentally difficult to estimate the optimal pre-filtering weight, based on the feature variances. As such, in one embodiment, the pre-filtering component 130 can be configured to dynamically determine the distance function $d(\tilde{p}_i, \tilde{p}_c)$ and the optimal filtering bandwidth term h.

In computing the weighting function, the pre-filtering component 130 can define a distance metric that measures a similarity between two world positions. Generally, the world positions can have irregular density and thus the range can vary locally, e.g., 1 to 1000. The pre-filtering component 130 could further perform a normalization process on the world positions so that pre-filtering can be performed optimally. In addition, the pre-filtering component 130, in constructing the distance function, could consider the dominant direction of motions at each pixel, in order to perform an anisotropic pre-filtering along the direction. In one embodiment, the pre-filtering component 130 could employ a Mahalanobis distance with a per-pixel covariance matrix $S_c$ of world position samples, as shown by Equation 6.

$d(\tilde{p}_i, \tilde{p}_c) = (\tilde{p}_i - \tilde{p}_c)^T S_c^{-1} (\tilde{p}_i - \tilde{p}_c)$  Equation 6—Distance Function The pre-filtering component 130 could compute the 3×3 covariance matrix $S_c$ at each center pixel c using the world position samples $s_{c,j}$. Doing so, the pre-filtering component 130 can preserve the high-frequency edges while effectively removing the noise introduced by the motion blur, since the use of the covariance matrix allows the pre-filtering component 130 to perform an anisotropic pre-filtering operation along the major direction of the motions per pixel.

Given the Mahalanobis distance (e.g., the distance function shown in FIG. 6), the pre-filtering component 130 can estimate an optimal value for the bandwidth term h such that the filtering error $|\hat{g}_c(k) - g_c(k)|^2$ is minimized per each center pixel c. As this optimization can be fundamentally challenging, the pre-filtering component 130 can, in some embodiments, be configured to estimate the error using the error function shown in Equation 7.

$|\hat{p}_c - p_c|^2$  Equation 7—Error Function

In calculating the error function of Equation 7, the pre-filtering component 130 can be configured to calculating the filtered world position $\hat{p}_c$ as shown in Equation 8:

Filtered World Position $$\hat{p}_c = \frac{1}{W} \sum_{i \in \Omega_c} w(\tilde{p}_i, \tilde{p}_c) \tilde{p}_i$$  Equation 8

In one embodiment, the pre-filtering component 130 can estimate an optimal weight $w(\tilde{p}_i, \tilde{p}_c)$ at each pixel so that the filtered world position is closely matched with the unknown world position $p_c$ that would be computed with an infinite number of samples. The pre-filtering component 130 could then pre-filter all other available geometries using the weighting function, defined by the bandwidth found by simultaneously optimizing the world position information.

In one embodiment, to estimate the optimal bandwidth value, the pre-filtering component 130 can employ Stein's unbiased risk estimator that estimates the expected mean squared error term $E|\hat{p}_c - p_c|^2$. To apply the general estimator, the pre-filtering component 130 can assume a statistical model $\tilde{p}_c = p_c + \varepsilon_c I$, where the noise term $\varepsilon_c$ follows the normal distribution shown in Equation 9.

$\varepsilon_c \sim N(0 \sigma^2(\tilde{p}_c)/n_c)$ Equation 9—Error Estimator Normal Distribution Here, I represents the 3×3 identity matrix. The parameter $\sigma^2(\tilde{p}_c)$ represents the sample variance of the world position, and $n_c$ is the sample count at the pixel c, respectively. Given the normality assumption, the pre-filtering component 130 can compute the unbiased estimation for the pre-filtering error as shown in Equation 10 below.

Pre-Filtering Error Estimation $$\text{SURE} = \frac{1}{D}\|\hat{p}_c - \tilde{p}_c\|^2 - \frac{\sigma^2(\hat{p}_c)}{n_c} + \frac{2\sigma^2(\hat{p}_c)}{D}\text{div}(\hat{p}_c) \quad \text{Equation 10}$$

In Equation 10, D represents the dimension of the input vector $\tilde{p}_c$, e.g., D=3, and $\text{div}(\hat{p}_c)$ represents the divergence term of the filtered value. Given a user-defined set of bandwidth values, the pre-filtering component 130 can perform a pre-filtering operation using bandwidth values from the user-defined set of bandwidth values, and the pre-filtering component 130 can calculate a respective measure of error (e.g., using Equation 10) for each bandwidth value. The pre-filtering component 130 could then select the bandwidth value with the lowest estimated measure of error as the optimal bandwidth value for performing the pre-filtering operation.

Once the pre-filtering component 130 has performed the pre-filtering operation on the G-buffers using the optimal bandwidth value, the result is the pre-filtered G-buffers shown in stage three 230. The rendering component 120 can then perform one or more filtering operations on the pre-filtered G-buffers at stage four 240, and can produce the output rendered image at stage five 250. Due to the pre-filtering operation performed by the pre-filtering component 130, the resulting output image rendered by the rendering component 120 will generally be of higher quality, as a substantial amount of the MC noise within the G-buffers was removed during the pre-filtering stage (i.e., the second stage 220) while still preserving the detailed edges within the image.

Figure 3:
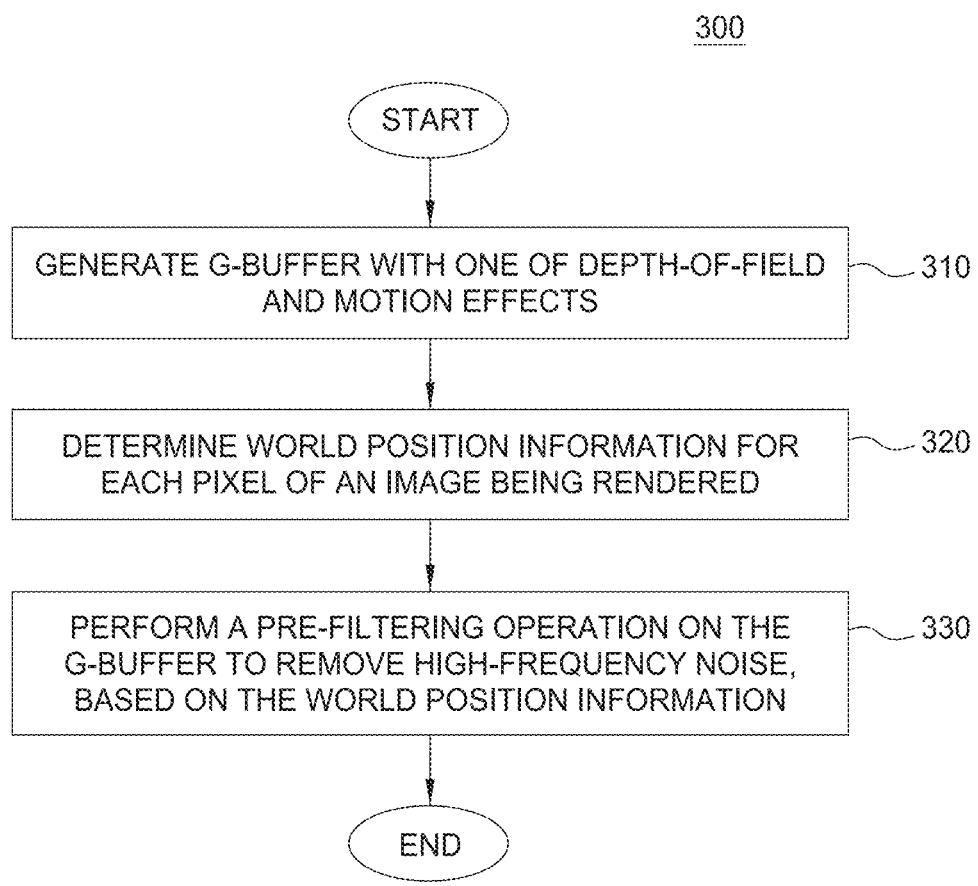
FIG. 3 is a flow diagram illustrating a method of denoising a G-buffer based on world position information, according to one embodiment described herein.

FIG. 3 is a flow diagram illustrating a method of denoising a G-buffer based on world position information, according to one embodiment described herein. As shown, the method 300 begins at block 300, where the rendering component 120 generates one or more G-buffers, with one of depth-of-field and motion effects having been applied to the one or more G-buffers. The pre-filtering component 130 then determines world position information for each of a plurality of pixels in an image being rendered (block 320). As discussed above, such world position information can include and/or be based on intersection points between elements of the three-dimensional scene being rendered and primary rays for the respective pixel. In one embodiment, the pre-filtering component 130 can take into account a per-sample measure of motion (e.g., a measure of rotation, a measure of translation, etc.).

The pre-filtering component 130 then performs a pre-filtering operation on the one or more G-buffers to remove high-frequency noise within the G-buffers, based on the world position information (block 330), and the method 300 ends. Advantageously, doing so enables the pre-filtering component 130 to selectively remove noise from the G-buffer(s), while still preserving non-noisy, high-frequency edges within the G-buffers. This enables subsequent filtering operations to process the data within the G-buffers more effectively, and ultimately results in a higher quality rendered image of the three-dimensional scene.

Figure 4:
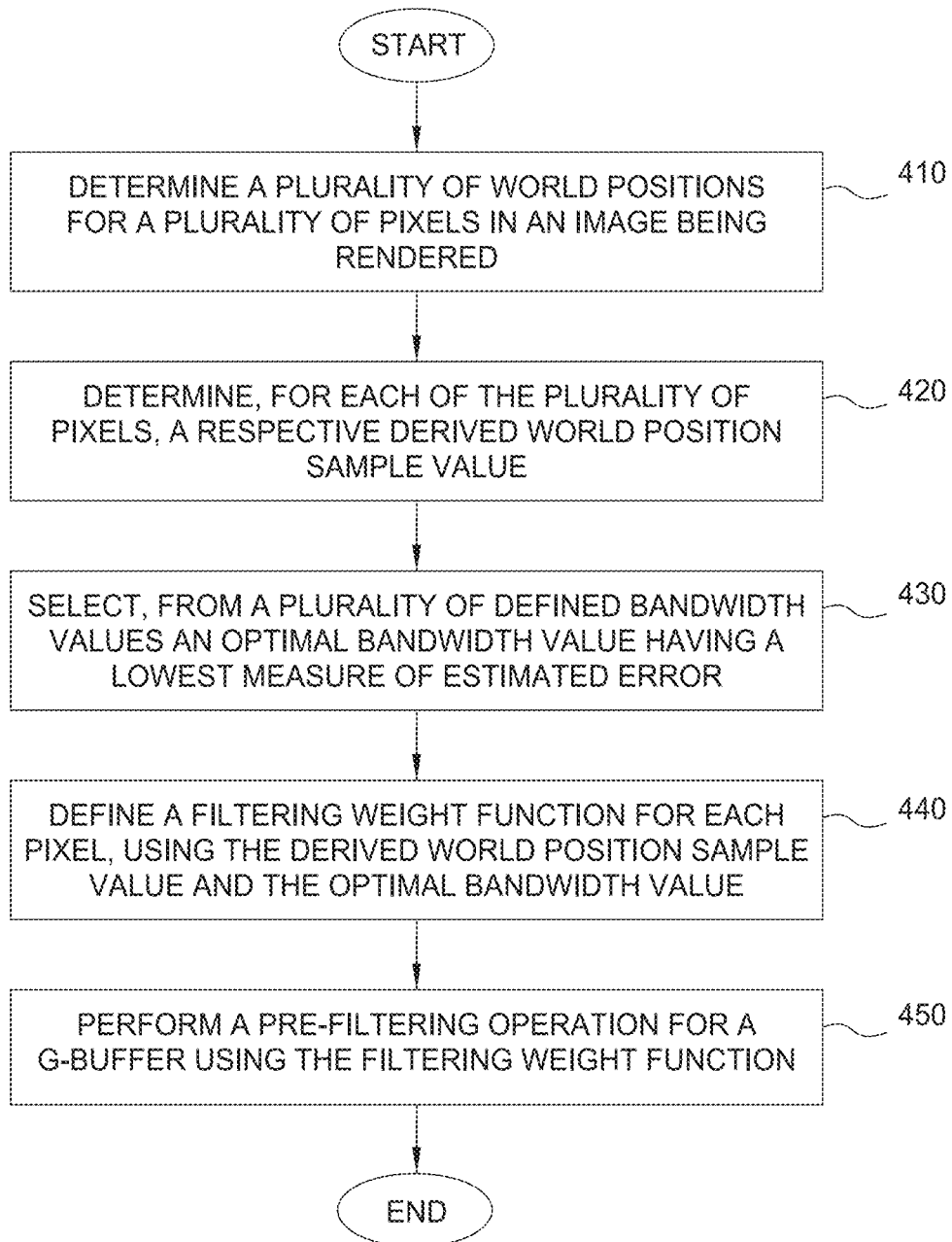
FIG. 4 is a flow diagram illustrating a method of denoising a G-buffer using filtering weight functions, according to one embodiment described herein.

FIG. 4 is a flow diagram illustrating a method of denoising a G-buffer using filtering weight functions, according to one embodiment described herein. As shown, the method 400 begins at block 410, where the pre-filtering component 130 determines a plurality of world positions for a plurality of pixels in an image being rendered. The pre-filtering component 130 further determines, for each of the plurality of pixels, a respective derived world position sample value, based on the plurality of world positions (block 420). In doing so, the pre-filtering component 130 can take into a count a motion of measure corresponding to the element within the three-dimensional scene corresponding to each intersection point, as discussed above.

Additionally, the pre-filtering component 130 selects, from a plurality of predefined bandwidth values, an optimal bandwidth value having a lowest measure of estimated error (block 430). For example, a user could define the plurality of predefined bandwidth values, and the pre-filtering component 130 could compute a respective estimated measure of error for performing a denoising pre-filtering operation on a G-buffer for each of the predefined bandwidth values. The pre-filtering component 130 could then select the predefined bandwidth value having the lowest measure of estimated error (i.e., the least amount of error) for use in performing the pre-filtering operation.

The pre-filtering component 130 then defines a filtering weight function for each pixel of the image being rendered, using the derived world position sample values and the optimal bandwidth values (block 440). Using the filtering weight function, the pre-filtering component 130 performs a pre-filtering operation for one or more G-buffers (block 450), and the method 400 ends.

Hardware Overview

Figure 5:
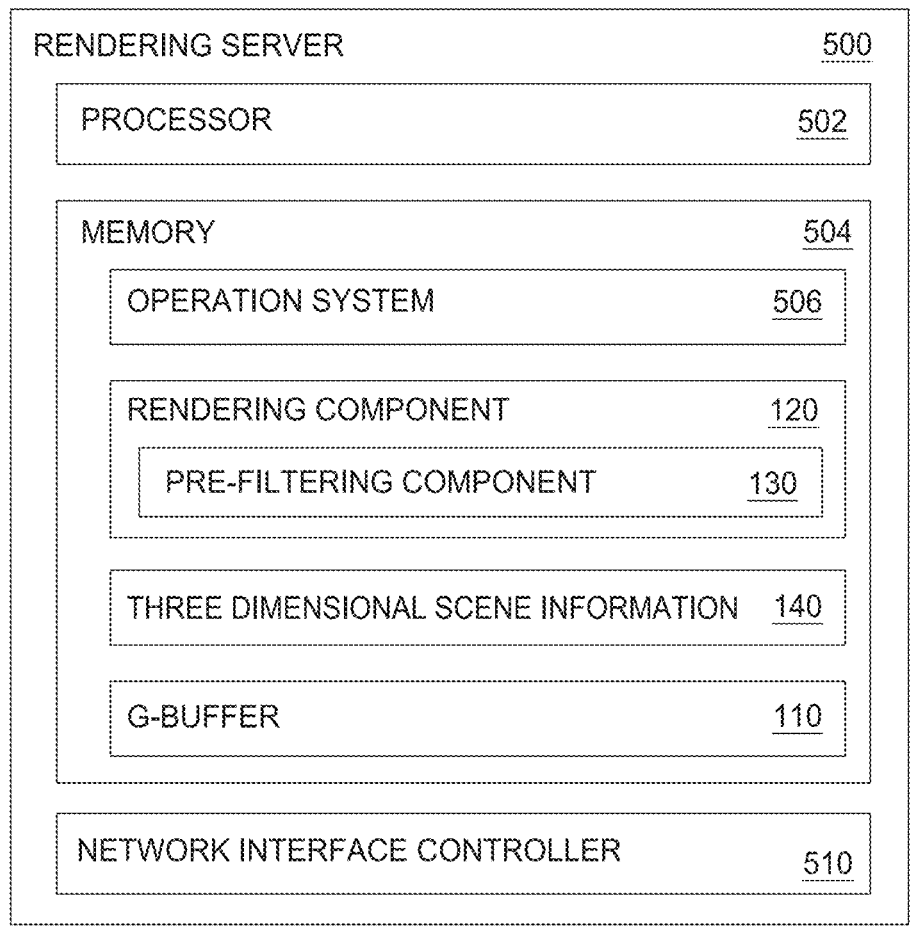
FIG. 5 is a block diagram illustrating a system configured with a pre-filtering component, according to one embodiment described herein.

FIG. 5 is a block diagram illustrating a system configured with a pre-filtering component, according to one embodiment described herein. This figure in no way limits or is intended to limit the scope of the present disclosure. System 500 may be a personal computer, video game console, personal digital assistant, rendering engine, or any other device suitable for practicing one or more embodiments of the present disclosure.

As shown, rendering system 500 includes a central processing unit (CPU) 502, a system memory 504 and a network interface controller 510, communicating via a bus path that may include a memory bridge (not shown). CPU 502 includes one or more processing cores, and, in operation, CPU 502 is the master processor of system 500, controlling and coordinating operations of other system components. System memory 504 stores software applications and data for use by CPU 502. CPU 502 runs software applications and optionally an operating system. The memory bridge (not shown) which may be, e.g., a Northbridge chip, is connected via a bus or other communication path (e.g., a HyperTransport link) to an I/O (input/output) bridge. Such an I/O bridge may be, e.g., a Southbridge chip, and may receive user input from one or more user input devices (e.g., keyboard, mouse, joystick, digitizer tablets, touch pads, touch screens, still or video cameras, motion sensors, and/or microphones) and forwards the input to CPU 502 via the memory bridge.

A display processor can be coupled to the memory bridge via a bus or other communication path (e.g., a PCI Express, Accelerated Graphics Port, or HyperTransport link); in one embodiment the display processor is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 504.

The rendering server 500 can include a display processor that periodically delivers pixels to a display device (e.g., a screen or conventional CRT, plasma, OLED, SED or LCD based monitor or television). Additionally, the display processor may output pixels to film recorders adapted to reproduce computer generated images on photographic film. The display processor can provide display device with an analog or digital signal.

A system disk may also connected to the I/O bridge and may be configured to store content and applications and data for use by CPU 502 and the display processor. The system disk can provide non-volatile storage for applications and data and may include fixed or removable hard disk drives, flash memory devices, and CD-ROM, DVD-ROM, Blu-ray, HD-DVD, or other magnetic, optical, or solid state storage devices.

A switch can provides connections between the I/O bridge and other components such as the network interface controller 510 and various add-in cards. The network interface controller 510 allows the system 500 to communicate with other systems via an electronic communications network, and may include wired or wireless communication over local area networks and wide area networks such as the Internet.

Other components (not shown), including USB or other port connections, film recording devices, and the like, may also be connected to the I/O bridge. For example, an audio processor may be used to generate analog or digital audio output from instructions and/or data provided by CPU 502, system memory 504, or system disk. Communication paths interconnecting the various components in FIG. 5 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, the display processor incorporates circuitry optimized for graphics and video processing, including, for example, video output circuitry, and constitutes a graphics processing unit (GPU). In another embodiment, display the processor incorporates circuitry optimized for general purpose processing. In yet another embodiment, display processor may be integrated with one or more other system elements, such as the memory bridge, CPU 502, and I/O bridge to form a system on chip (SoC). In still further embodiments, display processor is omitted and software executed by CPU 502 performs the functions of display processor.

Pixel data can be provided to display processor directly from CPU 502. In some embodiments, instructions and/or data representing a scene are provided to a render farm or a set of server computers, each similar to system 500, via network adapter 510 or system disk. The render farm generates one or more rendered images of the scene using the provided instructions and/or data. These rendered images may be stored on computer-readable media in a digital format and optionally returned to system 500 for display. Similarly, stereo image pairs processed by display processor may be output to other systems for display, stored in system disk, or stored on computer-readable media in a digital format.

Alternatively, CPU 502 provides the display processor with data and/or instructions defining the desired output images, from which display processor generates the pixel data of one or more output images, including characterizing and/or adjusting the offset between stereo image pairs. The data and/or instructions defining the desired output images can be stored in system memory 504 or graphics memory within display processor. In an embodiment, display processor includes 3D rendering capabilities for generating pixel data for output images from instructions and data defining the geometry, lighting shading, texturing, motion, and/or camera parameters for a scene. Display processor can further include one or more programmable execution units capable of executing shader programs, tone mapping programs, and the like.

CPU 502, render farm, and/or display processor can employ any surface or volume rendering technique known in the art to create one or more rendered images from the provided data and instructions, including rasterization, scan-line rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 504 is connected to CPU 502 directly (e.g., rather than through a bridge), and other devices communicate with system memory 504 via a memory bridge and CPU 502. In other alternative topologies the rendering server 500 contains a display processor connected to an I/O bridge or directly to CPU 502 (e.g., rather than to a memory bridge). In still other embodiments, the server 500 includes an I/O bridge and memory bridge integrated into a single chip. The particular components shown herein are optional; for instance, any number of add-in cards or peripheral devices might be supported.

As shown, the memory 504 contains an operating system 506, the rendering component 120, the three-dimensional scene information 540 and the G-buffer 110. The rendering component 120 is configured with the pre-filtering component 130, which is generally configured to selectively remove noise (e.g., MC noise) from the G-buffer 110. For example, the pre-filtering component 130 could identify the G-buffer 110 for rendering an image of a three-dimensional scene from a viewpoint, the G-buffer containing a plurality of values, and the pre-filtering component 130 could determine, for each of a plurality of pixels in the image being rendered, respective world position information based on the three-dimensional scene and a position and orientation of the viewpoint. The pre-filtering component 130 could then perform a pre-filtering operation to selectively remove the MC noise from the G-buffer, based on the determined world position information for the plurality of pixels.

In the preceding, reference is made to embodiments of the invention. However, it should be understood that the invention is not limited to specific described embodiments. Instead, any combination of the described features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method of selectively removing rendering noise from a geometric buffer prior to filtering, the computer-implemented method comprising:
   generating the geometric buffer for rendering an image of a three-dimensional scene from a viewpoint, the geometric buffer comprising at least one of a texture buffer, a depth buffer, and a normal buffer and including the rendering noise;
   determining, for each of a plurality of pixels in the image being rendered, a respective world position sample value based on the three-dimensional scene and a position and orientation of the viewpoint;
   performing, by operation of one or more computer processors, a pre-filtering operation on the geometric buffer in order to selectively remove the rendering noise from the geometric buffer using a respective filtering weight function for each of the plurality of pixels, wherein the respective filtering weight function is based on an optimal bandwidth value, variances of world position sample values of the three-dimensional scene, and the world position sample value for the respective pixel; and
   subsequent to removal of the rendering noise, performing a filtering operation on the geometric buffer to produce a filtered geometric buffer, wherein the image is rendered based on the filtered geometric buffer and output.

2. The computer-implemented method of claim 1, wherein the rendering noise is introduced due to at least one of a depth-of-field effect and a motion effect.

3. The computer-implemented method of claim 2, wherein performing the pre-filtering operation to selectively remove the rendering noise from the geometric buffer comprises:
   determining a plurality of predefined bandwidth values;
   determining a measure of estimated error for each of the plurality of predefined bandwidth values; and
   selecting the optimal bandwidth value from the plurality of predefined bandwidth values, the optimal bandwidth value having a lowest measure of estimated error.

4. The computer-implemented method of claim 3, wherein performing the pre-filtering operation to selectively remove the rendering noise from the geometric buffer further comprises:
   defining the respective filtering weight function for each of the plurality of pixels.

5. The computer-implemented method of claim 3, wherein determining the plurality of predefined bandwidth values further comprises:
   receiving a user input explicitly specifying at least one of the plurality of predefined bandwidth values.

6. The computer-implemented method of claim 1, wherein the pre-filtering operation is defined as $$\hat{g}_c(k) = \frac{1}{W} \sum_{i \in \Omega_c} w_i(k) \tilde{g}_i(k),$$

where $\hat{g}_c(k)$ is the filtered feature at center pixel c in k-th feature buffer, and $w_i(k)$ is a filtering weight allocated to a noisy feature $\tilde{g}_i(k)$ stored at an i-th neighboring pixel.

7. The computer-implemented method of claim 6, wherein the filtering weight function is defined at a neighboring pixel i for the k-th feature as a function of the world position sample value, wherein the function is defined as $$w_i(k) \equiv w(\tilde{p}_i, \tilde{p}_c) = \exp\left(-\frac{d(\tilde{p}_i, \tilde{p}_c)}{2h^2}\right),$$

where $d(\tilde{p}_i, \tilde{p}_c)$ is a distance function that computed a similarity between two world positions stored in pixel i and center c.

8. The computer-implemented method of claim 7, wherein the distance function comprises a Mahalanobis distance function with a per-pixel 3×3 covariance matrix of world position sample values, wherein the per-pixel 3×3 covariance matrix is computed at each center pixel c using the world position sample value.

9. The computer-implemented method of claim 1, wherein the generating, the determining, and the pre-filtering operation are performed on each of the texture buffer, the depth buffer and the normal buffer.

10. A system to selectively remove rendering noise from a geometric buffer prior to filtering, the system comprising:
    one or more computer processors; and
    a memory containing computer program code that, when executed by operation of the one or more computer processors, performs an operation comprising:
      generating the geometric buffer for rendering an image of a three-dimensional scene from a viewpoint, the geometric buffer comprising at least one of a texture buffer, a depth buffer, and a normal buffer and including the rendering noise;
      determining, for each of a plurality of pixels in the image being rendered, respective world position sample value based on the three-dimensional scene and a position and orientation of the viewpoint;
      performing a pre-filtering operation on the geometric buffer in order to selectively remove the rendering noise from the geometric buffer using a respective filtering weight function for each of the plurality of pixels, wherein the respective filtering weight function is based on an optimal bandwidth value, variances of world position sample values of the three-dimensional scene, and the world position sample value for the respective pixel; and
      subsequent to removal of the rendering noise, performing a filtering operation on the geometric buffer to produce a filtered geometric buffer, wherein the image is rendered based on the filtered geometric buffer and output.

11. The system of claim 10, wherein the rendering noise is introduced due to at least one of a depth-of-field effect and a motion effect.

12. The system of claim 11, wherein performing the pre-filtering operation to selectively remove the rendering noise from the geometric buffer comprises:
determining a plurality of predefined bandwidth values;
determining a measure of estimated error for each of the plurality of predefined bandwidth values; and
selecting the optimal bandwidth value from the plurality of predefined bandwidth values, the optimal bandwidth value having a lowest measure of estimated error.

13. The system of claim 12, wherein performing the pre-filtering operation to selectively remove the rendering noise from the geometric buffer further comprises:
defining the respective filtering weight function for each of the plurality of pixels.

14. The system of claim 10, wherein the pre-filtering operation is defined as $$\hat{g}_c(k) = \frac{1}{W} \sum_{i \in \Omega_c} w_i(k) \tilde{g}_i(k),$$

where $\hat{g}_c(k)$ is the filtered feature at center pixel c in k-th feature buffer, and $w_i(k)$ is a filtering weight allocated to a noisy feature $\tilde{g}_i(k)$ stored at an i-th neighboring pixel.

15. The system of claim 14, wherein the filtering weight function is defined at a neighboring pixel i for the k-th feature as a function of the world position sample value, wherein the function is defined as $$w_i(k) \equiv w(\tilde{p}_i, \tilde{p}_c) = \exp\left(-\frac{d(\tilde{p}_i, \tilde{p}_c)}{2h^2}\right),$$

where $d(\tilde{p}_i, \tilde{p}_c)$ is a distance function that computed a similarity between two world positions stored in pixel i and center c.

16. The system of claim 15, wherein the distance function comprises a Mahalanobis distance function with a per-pixel 3×3 covariance matrix of world position sample values, wherein the per-pixel 3×3 covariance matrix is computed at each center pixel c using the world position sample value.

17. A non-transitory computer-readable medium containing computer program code executable to perform an operation for selectively removing rendering noise from a geometric buffer prior to filtering, the operation comprising:
generating the geometric buffer for rendering an image of a three-dimensional scene from a viewpoint, the geometric buffer comprising at least one of a texture buffer, a depth buffer, and a normal buffer and including the rendering noise;
determining, for each of a plurality of pixels in the image being rendered, respective world position sample value based on the three-dimensional scene and a position and orientation of the viewpoint;
performing, by one or more computer processors when executing the computer program code, a pre-filtering operation on the geometric buffer in order to selectively remove the rendering noise from the geometric buffer using a respective filtering weight function for each of the plurality of pixels, wherein the respective filtering weight function is based on an optimal bandwidth value, variances of world position sample values of the three-dimensional scene, and the world position sample value for the respective pixel; and
subsequent to removal of the rendering noise, performing a filtering operation on the geometric buffer to produce a filtered geometric buffer, wherein the image is rendered based on the filtered geometric buffer and output.

18. The non-transitory computer-readable medium of claim 17, wherein the rendering noise is introduced due to at least one of a depth-of-field effect and a motion effect,
wherein performing the pre-filtering operation to selectively remove the rendering noise from the geometric buffer comprises:
determining a plurality of predefined bandwidth values;
determining a measure of estimated error for each of the plurality of predefined bandwidth values;
selecting the optimal bandwidth value from the plurality of predefined bandwidth values, the optimal bandwidth value having a lowest measure of estimated error.

19. The non-transitory computer-readable medium of claim 17, wherein the rendering noise is introduced due to at least one of a depth-of-field effect and a motion effect.

20. The non-transitory computer-readable medium of claim 17, wherein the generating, the determining, and the pre-filtering operation are performed on each of the texture buffer, the depth buffer and the normal buffer.

* * * * *

UNITED STATES PATENT AND TRADEMARK OFFICE
CERTIFICATE OF CORRECTION

PATENT NO. : 10,922,872 B2
APPLICATION NO. : 16/510677
DATED : February 16, 2021
INVENTOR(S) : Kenneth Mitchell et al.

Page 1 of 1

It is certified that error appears in the above-identified patent and that said Letters Patent is hereby corrected as shown below:

In the Specification

Column 7, Line 44, delete "n;" and insert -- $n_i$ --, therefor.

Column 9, Line 13, delete "$\varepsilon_c \sim N(0\sigma^2(\tilde{p}_c)/n_c)$" and insert -- $\varepsilon_c \sim N(0,\sigma^2(\tilde{p}_c)/n_c)$ --, therefor.

Column 9, Lines 24-26, delete "$\frac{1}{D}\|\hat{p}_c - \hat{p}_c\|^2 - \frac{\sigma^2(\hat{p}_c)}{n_c} + \frac{2\sigma^2(\hat{p}_c)}{D}div(\hat{p}_c)$" and insert -- $\frac{1}{D}\|\tilde{p}_c - \tilde{p}_c\|^2 - \frac{\sigma^2(\tilde{p}_c)}{n_c} + \frac{2\sigma^2(\tilde{p}_c)}{D}div(\hat{p}_c)$ --, therefor.

In the Claims

Column 17, Line 24, in Claim 14, delete "$\hat{g}_c(k)_is$" and insert -- $\hat{g}_c(k)$ is --, therefor.

Signed and Sealed this
Twentieth Day of April, 2021

Drew Hirshfeld
*Performing the Functions and Duties of the
Under Secretary of Commerce for Intellectual Property and
Director of the United States Patent and Trademark Office*